(12) United States Patent
Uesugi (10) Patent No.: US 11,656,858 B2
(45) Date of Patent: May 23, 2023

(54) PROGRAM GENERATION UNIT, INFORMATION PROCESSING DEVICE, PROGRAM GENERATION METHOD, AND PROGRAM

(71) Applicant: NEC Platforms, Ltd., Kawasaki (JP)

(72) Inventor: Takahiko Uesugi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 254 days.

(21) Appl. No.: 16/981,014

(22) PCT Filed: Mar. 19, 2019

(86) PCT No.: PCT/JP2019/011345
§ 371 (c)(1),
(2) Date: Sep. 15, 2020

(87) PCT Pub. No.: WO2019/181904
PCT Pub. Date: Sep. 26, 2019

(65) Prior Publication Data
US 2021/0019129 A1    Jan. 21, 2021

(30) Foreign Application Priority Data

Mar. 19, 2018    (JP) .............................. JP2018-051582

(51) Int. Cl.
*G06F 8/41* (2018.01)
*G06F 8/54* (2018.01)
*G06F 1/3296* (2019.01)

(52) U.S. Cl.
CPC .............. *G06F 8/54* (2013.01); *G06F 1/3296* (2013.01); *G06F 8/41* (2013.01); *G06F 8/447* (2013.01)

(58) Field of Classification Search
CPC ... G06F 8/54; G06F 8/41; G06F 8/447; G06F 1/3296
(Continued)

(56) References Cited

U.S. PATENT DOCUMENTS 4,393,377 A * 7/1983 Couper .................... G09G 5/24
345/472
4,570,217 A * 2/1986 Allen .................... G06F 9/4825
700/83
(Continued)

FOREIGN PATENT DOCUMENTS

JP     2003-202942 A    7/2003
JP     2010-250858 A    11/2010

OTHER PUBLICATIONS

Title: Low power architecture design and compilation techniques for high-performance processors author: CL Su, et al., published on 1994.*
Title: Synthesis techniques for low-power hard real-time systems on variable voltage processors author: Hong published on 1998.*
Title: Imitation learning for dynamic VFI control in large-scale manycore systems, author: RG Kim published on 2017.*
(Continued)

*Primary Examiner* — Chameli Das (57) ABSTRACT

A program generation unit that generates voltage value information for making an LSI run on an operating voltage value based on a voltage context, wherein the program generation unit is provided with: a first compiler configured to compile a source program and that generate an object including a command sequence; a second compiler configured to generate the voltage value information based on a command density in the command sequence; and a linker configured to link the object with the voltage value information and that generates a user program.

5 Claims, 7 Drawing Sheets

(58) Field of Classification Search
USPC .......................................... 717/140; 713/300
See application file for complete search history.

(56) References Cited

U.S. PATENT DOCUMENTS

| | | | | |
|---|---|---|---|---|
| 5,266,848 A * | 11/1993 | Nakagome | ......... | H03K 19/0013 326/62 |
| 10,621,116 B2 * | 4/2020 | Brief | .................... | G06F 13/1668 |
| 2003/0135849 A1 * | 7/2003 | Sakata | ................ | G06F 9/44542 717/162 |
| 2003/0163296 A1 * | 8/2003 | Richards | ................. | H02P 21/16 703/14 |
| 2004/0075747 A1 * | 4/2004 | Silverbrook | ....... | G06K 7/10762 348/207.99 |
| 2007/0255929 A1 * | 11/2007 | Kasahara | ................ | G06F 1/329 712/E9.001 |
| 2008/0134138 A1 * | 6/2008 | Chamieh | ................. | G06F 8/315 717/105 |
| 2009/0313490 A1 | 12/2009 | Tani | | |
| 2014/0136816 A1 * | 5/2014 | Krig | .................... | G06F 9/30036 712/15 |
| 2015/0309779 A1 | 10/2015 | Baskaran et al. | | |
| 2016/0216969 A1 * | 7/2016 | Suarez Gracia | ...... | G06F 1/3296 |
| 2017/0132337 A1 * | 5/2017 | Li | ........................ | G06F 30/367 |
| 2017/0351318 A1 | 12/2017 | Gu et al. | | |

OTHER PUBLICATIONS

Title: A programmable and configurable mixed-mode FPAA SoC, author: S George, published on 2016.*

Extended European Search Report for EP Application No. EP19771160.9 dated Nov. 17, 2021.

Sohaib Majzoub: "Voltage island design in multi-core SIMD processors", Design and Test Workshop (IDT), 2010 5th, International, IEEE, Dec. 14, 2010 (Dec. 14, 2010), pp. 18-23, XP031923364, DOI: 10.1109/IDT.2010.5724399, ISBN: 978-1-61284-291-2.

Saputra H et al: "Energy-conscious compilation based on voltage scaling", ACM SIGPLAN Notices, Association for Computing Machinery, US, vol. 37, No. 7, Jun. 19, 2002 (Jun. 19, 2002), pp. 2-11, XP058399086, ISSN: 0362-1340, DOI: 10.1145/566225. 513832.

International Search Report for PCT Application No. PCT/JP2019/011345, dated May 28, 2019.

Hiroshi Sasaki et al., Dynamic Voltage Scaling Method Based on Statistical Analysis, IPSJ Transactions on Advanced Computing Systems, Nov. 15, 2006, vol. 47, No. SIG 18(ACS 16), pp. 80-91, ISSN 0387-5806, Japan.

Tohru Ishihara et al., Low power consumption method which uses variable voltage processor, and the fundamental theorem, Design Automation Symposium '98, Jul. 16, 1998, vol. 98, No. 9, pp. 287-292, ISSN 1344-0640, Japan.

* cited by examiner

PROGRAM GENERATION UNIT, INFORMATION PROCESSING DEVICE, PROGRAM GENERATION METHOD, AND PROGRAM

This application is a National Stage Entry of PCT/JP2019/011345 filed on Mar. 19, 2019, which claims priority from Japanese Patent Application 2018-051582 filed on Mar. 19, 2018, the contents of all of which are incorporated herein by reference, in their entirety.

TECHNICAL FIELD

The present invention relates to a program generation unit, an information processing device, a program generation method, and a program.

BACKGROUND ART

The controlling of information processing devices so as to eliminate power consumption is known.

For example, Patent Document 1 and Patent Document 2 disclose the feature of changing operating voltage values in order to control the power consumption so as to be reduced.

CITATION LIST

Patent Literature

[Patent Document 1]
Japanese Unexamined Patent Application, First Publication No. 2010-250858
[Patent Document 2]
Japanese Unexamined Patent Application, First Publication No. 2003-202942

SUMMARY OF INVENTION

Problem to be Solved by the Invention

Patent Document 1 discloses the feature of changing operating voltage values based on power contexts in which power control information is stored for each program.

The information processing device in Patent Document 1 changes the operating voltage values when executing programs based on success rates or failure rates in the power control information, which are power contexts. However, in Patent Document 1, in order to generate power contexts, a program must be executed at least once in order to check the success rate or the failure rate in advance, and changing the operating voltage values in accordance with user programs creates a burden.

Additionally, in Patent Document 2, if a set of commands in which the same minimum operating voltage value command occurs consecutively is detected, then the operating voltage values are changed when a program is executed.

However, in Patent Document 2, the operating voltage values are not changed as long as the same minimum operating voltage value command does not occur consecutively. For this reason, operating voltage values that are appropriate for programs must be checked in advance, and changing the operating voltage values in accordance with user programs creates a burden.

In view of the above-mentioned problems, an example objective of the present invention is to provide a program generation unit, an information processing device, a program generation method, and a program in which changing operating voltage values in accordance with user programs does not tend to create a burden.

Means for Solving the Problem

According to a first aspect of the present invention, a program generation unit generates voltage value information for making an LSI run on an operating voltage value based on a voltage context. The program generation unit includes: a first compiler configured to compile a source program and that generates an object including a command sequence; a second compiler configured to generate the voltage value information based on a command density in the command sequence; and a linker configure to link the object with the voltage value information and that generates a user program.

According to a second aspect of the present invention, a program generation method generates voltage value information for making an LSI run on an operating voltage value based on a voltage context. The program generation method includes: compiling a source program and generating an object including a command sequence; generating the voltage value information based on a command density in the command sequence; and linking the object with the voltage value information and generating a user program.

According to a third aspect of the present invention, a program makes a computer generate voltage value information for making an LSI run on an operating voltage value based on a voltage context, wherein the program makes the computer execute processes. The process includes: compiling a source program and generating an object including a command sequence; generating the voltage value information based on a command density in the command sequence; and linking the object with the voltage value information and generating a user program.

Advantageous Effects of Invention

According to the present invention, changing operating voltage values in accordance with user programs does not tend to create a burden.

DESCRIPTION OF EMBODIMENTS

Hereinafter, various embodiments of the present invention will be explained by using the drawings.

First Embodiment

An information processing device according to a first embodiment will be explained with reference to FIGS. 1 to 3.

Figure 1:
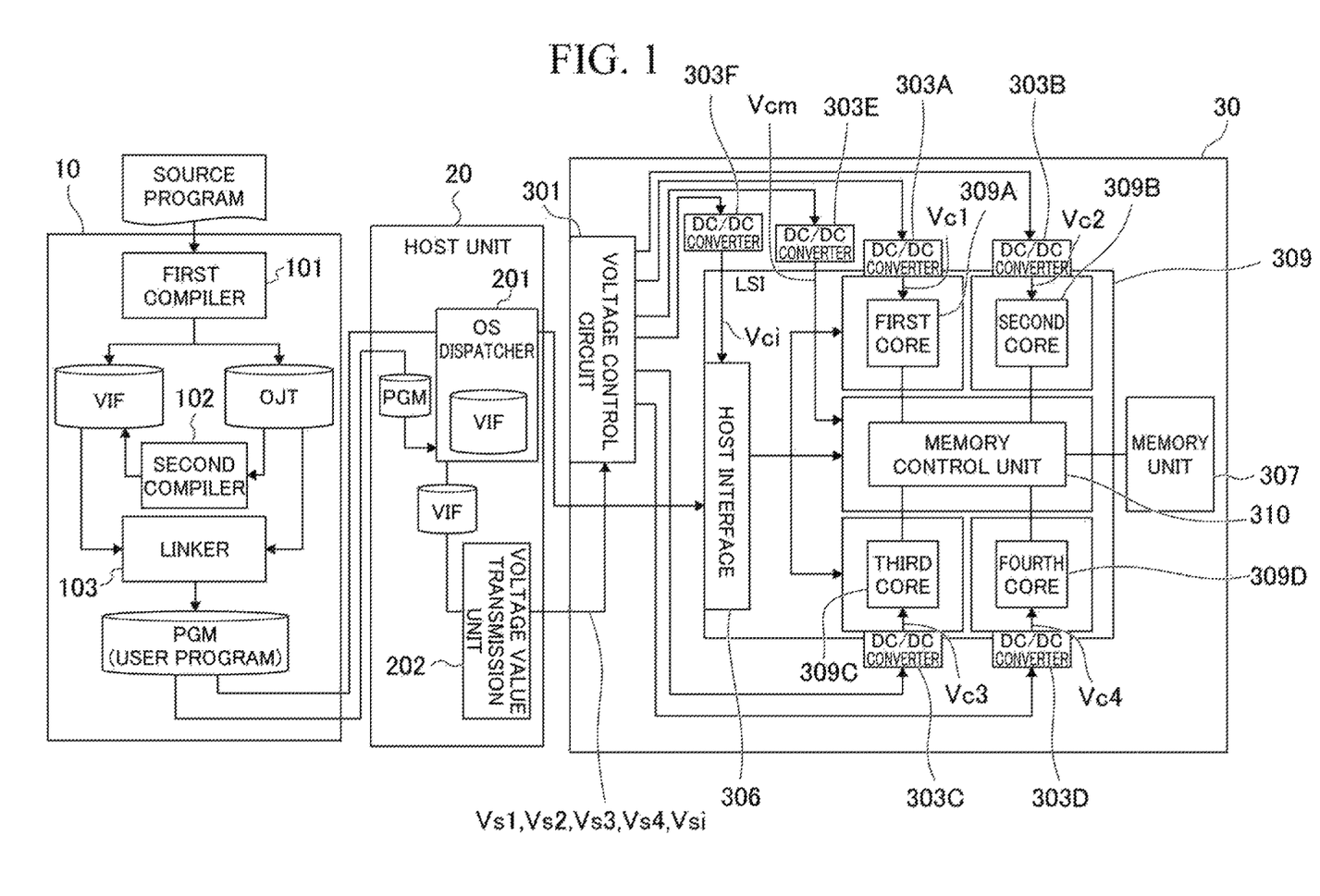
FIG. 1 is a block diagram of an information processing device according to a first embodiment.

As illustrated in FIG. 1, an information processing device 1 is provided with a program generation unit 10, a host unit 20, and a system unit 30.

(Structure)

The program generation unit 10 is provided with a first compiler 101, a second compiler 102, and a linker 103.

The host unit 20 is provided with an OS dispatcher 201 and a voltage value transmission unit 202.

The system unit 30 is provided with a voltage control circuit 301, a memory unit 307 and an LSI (Large Scale Intergration) 309.

The system unit 30 is further provided with a first core power source 303A, a second core power source 303B, a third core power source 303C, a fourth core power source 303D, a memory control power source 303E, and an IO power source 303F. In the present embodiment, each of these power sources is a DC/DC converter, and the output voltages are controlled by control from the voltage control circuit 301.

The LSI 309 is provided with a first core 309A, a second core 309B, a third core 309C, a fourth core 309D, a host interface 306, and a memory control unit 310.

(Program Generation Unit)

The first compiler 101 receives a source program prepared by a user.

The first compiler 101 compiles the received source program and generates an object OJT including a command sequence.

The first compiler 101 sends the generated object OJT to both the second compiler 102 and the linker 103.

The second compiler 102 receives the object OJT from the first compiler 101.

The second compiler 102 analyzes the command densities, respectively, of fixed point number commands, LDST (load/store) commands, logic operation commands, shift operation commands, and floating point number commands in the received object OJT, and generates voltage value information VIF.

The second compiler 102 sends the generated voltage value information VIF to the linker 103.

The linker 103 receives the object OJT from the first compiler 101. Additionally, the linker 103 receives the voltage value information VIF from the second compiler 102.

The linker 103 links the object OJT with the voltage value information VIF, and sequentially generates user programs PGM (programs).

The linker 103 sequentially sends the generated user programs PGM to the host unit 20.

(Host Unit)

The OS dispatcher 201 sequentially receives the user programs PGM generated by the linker 103.

The OS dispatcher 201 assigns the cores that are to execute the respective user programs PGM that have been sequentially received. The OS dispatcher 201 considers the free space in each of the cores, namely, the first core 309A, the second core 309B, the third core 309C, and the fourth core 309D, and determines which core to assign each user program PGM. For example, the OS dispatcher 201 determines the core that is to be assigned to each user program PGM based on the processing conditions, such as the usage state and the load state of the resources in each core.

The OS dispatcher 201 sequentially sends the voltage value information VIF of the respective user programs PGM to the voltage value transmission unit 202.

The voltage value transmission unit 202 sequentially receives the voltage value information VIF of the respective user programs PGM from the OS dispatcher 201.

The voltage value transmission unit 202 generates set voltage values based on the voltage value information VIF of the respective user programs PGM, and sends the set voltage values to the voltage control circuit 301.

(System Unit)

Before the respective user programs PGM are executed, the system unit 30 sets the operating voltage values in the cores and the host interface 306 to the set voltage values transmitted from the voltage value transmission unit 202.

Hereinafter, "before the respective user programs PGM are executed" will refer to context switching (CSW) times before the user programs PGM start being executed in the respective cores. The CSW, for example, indicates steps for saving and restoring the states of the cores so that multiple processes can share a single core.

The voltage control circuit 301 receives the set voltage values from the voltage value transmission unit 202. The voltage control circuit 301 controls the respective output voltages from the first core power source 303A, the second core power source 303B, the third core power source 303C, the fourth core power source 303D, the memory control power source 303E, and the TO power source 303F based on the set voltage values that have been received.

The first core power source 303A supplies power to the first core 309A by outputting a first core operating voltage value Vc1, which is a prescribed DC voltage, in accordance with the control by the voltage control circuit 301.

The second core power source 303B supplies power to the second core 309B by outputting a second core operating voltage value Vc2, which is a prescribed DC voltage, in accordance with the control by the voltage control circuit 301.

The third core power source 303C supplies power to the third core 309C by outputting a third core operating voltage value Vc3, which is a prescribed DC voltage, in accordance with the control by the voltage control circuit 301.

The fourth core power source 303D supplies power to the fourth core 309D by outputting a fourth core operating voltage value Vc4, which is a prescribed DC voltage, in accordance with the control by the voltage control circuit 301.

The memory control power source 303E supplies power to the memory control unit 310 by outputting a memory control operating voltage value Vcm, which is a prescribed DC voltage, in accordance with the control by the voltage control circuit 301.

The IO power source 303F supplies power to the host interface 306 by outputting an IO operating voltage value Vci, which is a prescribed DC voltage, in accordance with the control by the voltage control circuit 301.

The memory unit 307 is a common memory unit that can be accessed by any of the cores for reading and writing data.

(LSI)

The first core 309A, the second core 309B, the third core 309C, and the fourth core 309D each process user programs PGM assigned by the OS dispatcher 201.

The host interface 306 communicates with the OS dispatcher 201 and supplies the user programs PGM to the cores, among the respective cores, to which the user programs PGM have been assigned.

The memory control unit 310 controls access to the memory unit 307 by each of the cores among the first core 309A, the second core 309B, the third core 309C, and the fourth core 309D.

(First Compiler and Second Compiler)

The functions of the first compiler 101 and the second compiler 102 will be explained in detail.

Figure 2:
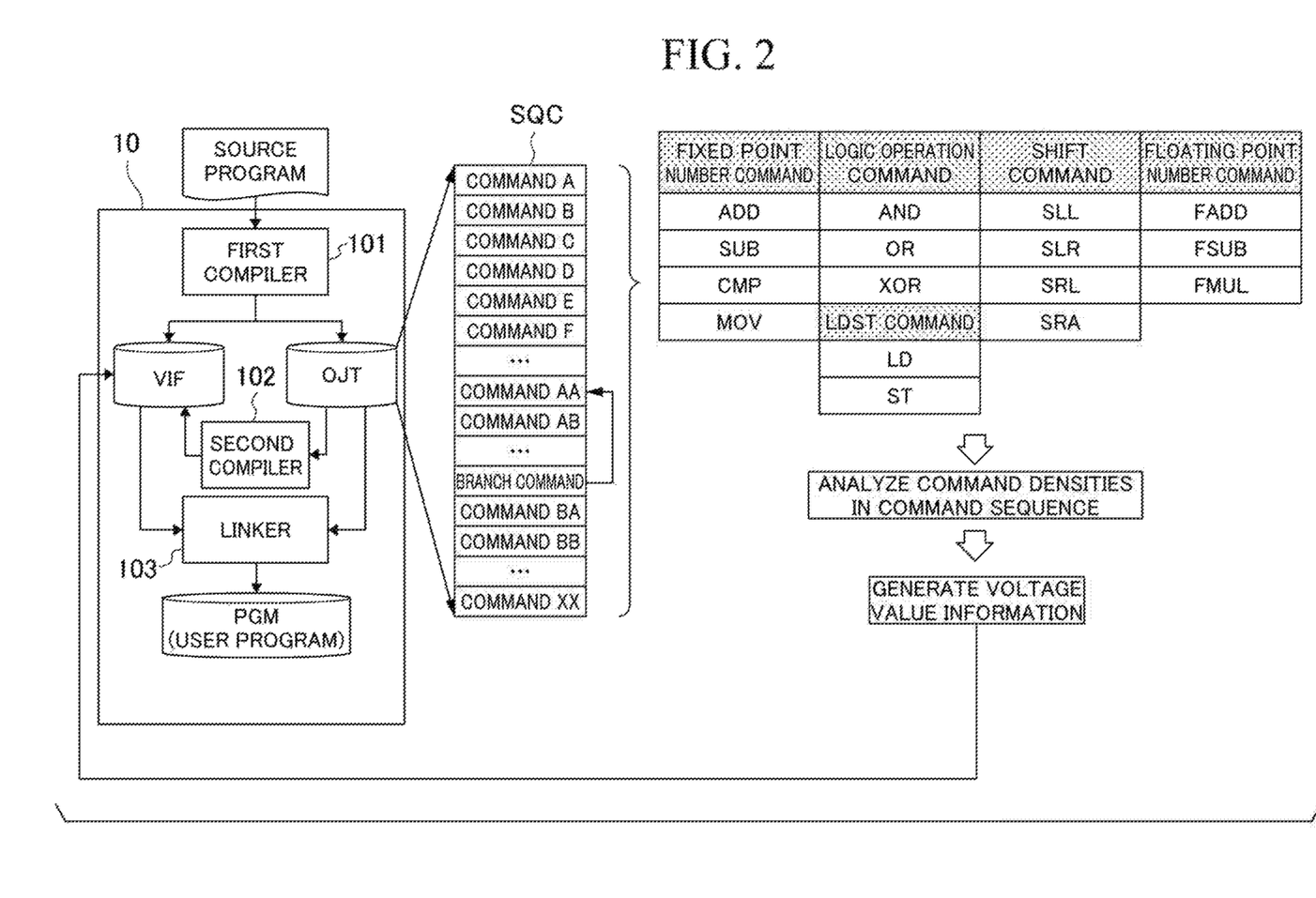
FIG. 2 is a diagram illustrating the functions of a program generation unit according to a first embodiment.

FIG. 2 is a diagram illustrating the functions of a program generation unit according to the first embodiment. The first compiler 101 generates a command sequence SQC that can be processed by the system unit 30 as an object OJT.

In the case of the present embodiment, as illustrated in FIG. 2, the command A, the command B, the command C, . . . , the command XX in the command sequence SQC are each classified as one of a fixed point number command, a logic operation command, a shift operation command, a floating point number command, and an LDST command (load-and-store command).

The second compiler 102 analyzes the command densities in the command sequence SQC as indicated below, and prepares voltage value information VIF as indicated below. The command densities indicate, for example, the proportions, within the command sequence SQC, occupied by the command types to which the commands included in the command sequence SQC belong.

(Command Density Analysis)

The second compiler 102 classifies each of the commands, i.e., the command A, the command B, the command C, . . . , the command XX in the command sequence SQC, into one of the command types among fixed point number commands, logic operation commands, shift operation commands, floating point number commands, and LDST commands (load-and-store commands).

As a result of the command density analysis, the second compiler 102 determines the command type, among the multiple command types, into which the highest proportion of the commands included in the command sequence SQC have been classified.

(Voltage Value Information Generation)

The voltage value information VIF is information for making the LSI run with operating voltage values based on voltage contexts.

The second compiler 102 generates voltage value information VIF by performing one of the actions in the following (Case 1) to (Case 5) in accordance with the results of command density analysis, and sends the generated voltage value information VIF to the linker 103. In other words, the second compiler 102 classifies the commands included in the command sequence SQC into multiple command types, and generates voltage value information VIF based on the command type into which the highest proportion have been classified.

(Case 1) If the proportion of LDST commands is the highest, then "settings information for raising the 10 operating voltage value" is generated as the voltage value information VIF.

(Case 2) If the proportion of logic operation commands is the highest, then "settings information for lowering the core operating voltage values" is generated as the voltage value information VIF.

(Case 3) If the proportion of shift operation commands is the highest, then "settings information for setting the core operating voltage values to an intermediate voltage" is generated as the voltage value information VIF.

(Case 4) If the proportion of fixed point number commands is the highest, then "settings information for setting the core operating voltage values to an intermediate voltage" is generated as the voltage value information VIF.

(Case 5) If the proportion of floating point number commands is the highest, then "settings information for setting the core operating voltage values to the maximum" is generated as the voltage value information VIF.

Thus, the second compiler sets the voltage value information in accordance with the command type with the highest proportion indicated by the command density. The second compiler, for example, sets the voltage value information to a value that is increased or decreased in accordance with the command type with the highest proportion.

(Voltage Transmission Unit)

The functions of the voltage value transmission unit 202 will be explained in detail.

Figure 3:
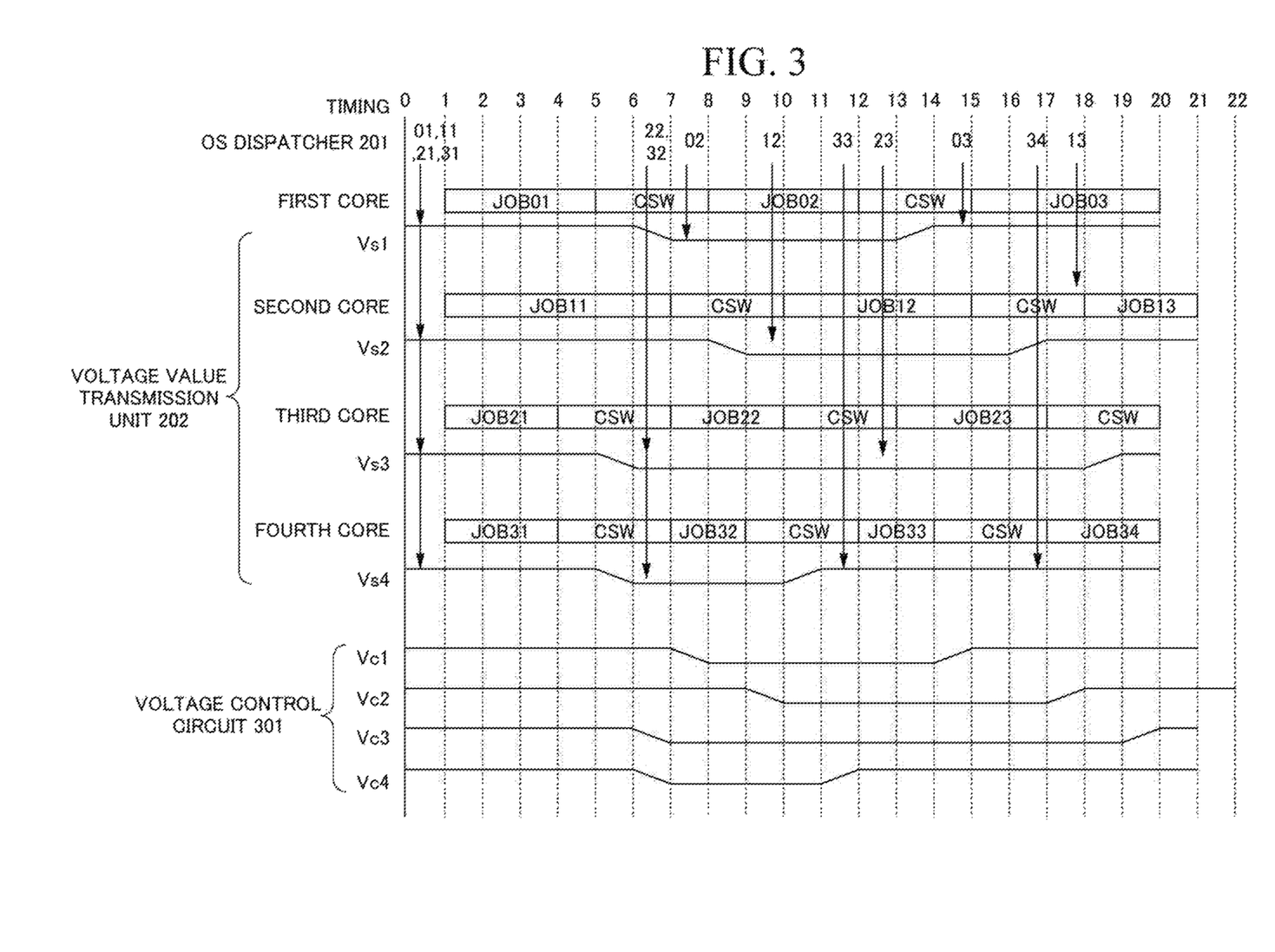
FIG. 3 is a time chart of the operations in the information processing device according to the first embodiment.

FIG. 3 is a time chart showing the operations in the information processing device according to the first embodiment. In FIG. 3, the execution time of each JOB is set to be short for the purpose of explanation, but the actual JOB execution times are longer than those indicated. FIG. 3 indicates the conditions under which the respective user programs PGM assigned to the respective cores are executed by the OS dispatcher 201. In FIG. 3, the respective user programs PGM that are executed are indicated as JOB01, JOB02, JOB03, JOB11, JOB34.

First, at timing 0, the OS dispatcher 201 assigns JOB01 to the first core 309A, JOB 11 to the second core 309B, JOB21 to the third core 309C, and JOB31 to the fourth core 309D.

In this case, at timing 0, the voltage value transmission unit 202 generates, as the first core set voltage value Vs1, a voltage value appropriate for the first core 309A based on the voltage value information VIF.

In (Case 1), the voltage value transmission unit 202 sets a prescribed initial setting voltage value, unchanged, as the first core set voltage value Vs1.

In (Case 2), the voltage value transmission unit 202 sets a voltage value obtained by lowering the initial setting voltage value with respect to the prescribed initial setting voltage value as a new first core set voltage value Vs1.

In (Cases 3 to 5), the voltage value transmission unit 202 sets a voltage value based on the voltage value information VIF as the new first core set voltage value Vs1.

Similarly, at timing 0, the voltage value transmission unit 202 generates a voltage value appropriate for the second core 309B based on the voltage value information VIF as the second core set voltage value Vs2, a voltage value appropriate for the third core 309C based on the voltage value information VIF as the third core set voltage value Vs3, and a voltage value appropriate for the fourth core 309D based on the voltage value information VIF as the fourth core set voltage value Vs4.

In the present embodiment, at timing 0, the voltage value transmission unit 202 sends, to the voltage control circuit 301, the first core set voltage value Vs1, the second core set voltage value Vs2, the third core set voltage value Vs3, and the fourth core set voltage value Vs4 that have been generated.

Upon receiving the respective set voltage values form the voltage value transmission unit 202, the voltage control circuit 301 controls the operating voltage values of the respective cores so as to be the set voltage values at timing 0.

Specifically, the voltage control circuit 301 controls the first core power source 303A so that the first core operating voltage value Vc1 supplied to the first core 309A becomes the first core set voltage value Vs1.

Similarly, the voltage control circuit 301 controls the second core power source 303B so that the second core operating voltage value Vc2 supplied to the second core 309B becomes the second core set voltage value Vs2.

Similarly, the voltage control circuit 301 controls the third core power source 303C so that the third core operating voltage value Vc3 supplied to the third core 309C becomes the third core set voltage value Vs3.

Similarly, the voltage control circuit 301 controls the fourth core power source 303D so that the fourth core operating voltage value Vc4 supplied to the fourth core 309D becomes the fourth core set voltage value Vs4.

Though not shown in FIG. 3, the information processing device 1 similarly sets the host interface operating voltage value Vci.

In other words, at timing 0, the voltage value transmission unit 202 generates, as the host interface set voltage value Vsi, a voltage value that is appropriate for the host interface 306 based on the voltage information VIF, and sends the generated host interface set voltage value Vsi to the voltage control circuit 301. Furthermore, the voltage control circuit 301 controls the IO power source 303F so that the host interface operating voltage value Vci supplied to the host interface 306 becomes the host interface set voltage value Vsi.

In Case 1, the voltage value transmission unit 202 sets, as a new host interface set voltage value Vsi, a voltage value obtained by raising the voltage of the initial setting with respect to the prescribed initial setting voltage value.

Additionally, in the present embodiment, the voltage control circuit 301 controls the memory control operating voltage value Vcm so as to become a prescribed initial setting voltage value.

Next, at timing 1, the execution, respectively, of JOB01 in the first core 309A, JOB11 in the second core 309B, JOB21 in the third core 309C, and JOB31 in the fourth core 309D is started.

Next, at timing 8, the execution of JOB02 is started in the first core 309A. At this time, one timing before the timing at which the execution of JOB02 is started, the voltage value transmission unit 202 generates, as the first core set voltage value Vs1, a voltage value appropriate for the first core 309A based on the voltage value information VIF.

In the present embodiment, the information processing device 1 lowers the voltage supplied to the first core 309A one timing before the timing at which the execution of JOB02 is started.

For example, if the voltage value information VIF for JOB02 is "settings information for lowering the core operating voltage value", then the voltage value transmission unit 202 generates, as a new first core set voltage value Vs1, a voltage lower than the first core set voltage value Vs1 that was set at timing 1, and sends the new first core set voltage value Vs1 to the voltage control circuit 301. As a result thereof, the information processing device 1 lowers the voltage supplied to the first core 309A one timing before the timing at which the execution of JOB02 is started.

Similarly, at timing 15, the execution of JOB03 is started in the first core 309A. At this time, one timing before the timing at which the execution of JOB3 is started, the voltage value transmission unit 202 generates, as the first core set voltage value Vs1, a voltage value appropriate for the first core 309A based on the voltage value information VIF.

In the present embodiment, the information processing device 1 raises the voltage supplied to the first core 309A one timing before the timing at which the execution of JOB03 is started.

Similarly, the execution of JOB12 is started at timing 10, and the execution of JOB13 is started at timing 18 in the second core 309B. At this time, one timing before the timing at which the execution of each JOB is started, the voltage value transmission unit 202 respectively generates, as new second core set voltage values Vs2, voltage values appropriate for the second core 309B based on the voltage value information VIF.

Similarly, the execution of JOB22 is started at timing 7, and the execution of JOB23 is started at timing 13 in the third core 309C. At this time, one timing before the timing at which the execution of each JOB is started, the voltage value transmission unit 202 respectively generates, as new third core set voltage values Vs3, voltage values appropriate for the third core 309C based on the voltage value information VIF.

However, in the case of the present embodiment, the appropriate voltage value is the same for JOB22 and JOB23. For this reason, the third core set voltage value Vs3 generated for JOB22 and the third core set voltage value Vs3 generated for JOB23 are the same voltage.

Similarly, the execution of JOB32 is started at timing 7, the execution of JOB33 is started at timing 12, and the execution of JOB34 is started at timing 17 in the fourth core 309D. At this time, one timing before the timing at which the execution of each JOB is started, the voltage value transmission unit 202 respectively generates, as new fourth core set voltage values Vs4, voltage values appropriate for the fourth core 309D based on the voltage value information VIF.

However, in the case of the present embodiment, the appropriate voltage value is the same for JOB33 and JOB34. For this reason, the fourth core set voltage value Vs4 generated for JOB33 and the fourth core set voltage value Vs4 generated for JOB34 are the same voltage.

(Functions and Effects)

In the information processing device 1 of the present embodiment, the second compiler 102 analyzes the respective command densities of fixed point number commands, LDST commands, logic operation commands, shift operation commands, and floating point number commands in a command sequence. For this reason, voltages appropriate for the respective user programs PGM can be supplied to the cores and the host interface without checking for the operating voltage values that are appropriate for the respective user programs PGM in advance. Thus, it is possible to eliminate wasted power consumption.

Therefore, in the information processing device 1, changes to the operating voltage values in accordance with the respective user programs PGM do not tend to become a burden.

Additionally, in the present embodiment, the necessary voltage values are supplied for the respective user programs PGM. Thus, the information processing device 1 can suppress wasted power and achieve low power consumption.

Furthermore, in the present embodiment, the power sources of the respective cores are separated, and the operating voltage values can be controlled separately for the respective cores and the host interface. For this reason, the information processing device 1 can supply power separately to each core and the host interface by setting, separately for each core and the host interface, voltages appropriate for the assigned user programs PGM.

Therefore, the information processing device 1 can supply the optimum power with less waste.

Voltage values are set so as to allow operation even for programs in which the maximum electric current flows. For this reason, in an information processing device in which the operating voltage values are not changed, excessive power is sometimes supplied depending on the program.

In order to reduce such excess power in the information processing device of Patent Document 1, power control information that is separate for each program is used, and voltage control is implemented after running the program once in order to check whether or not it can be successfully run. For this reason, an information processing device as in Patent Document 1 cannot supply the cores with the appropriate operating voltage values for executing a program from the first time the program is run. Furthermore, when a program is updated, the appropriate operating voltage values cannot be supplied to the cores.

In contrast therewith, the information processing device 1 of the present embodiment, as mentioned above, analyzes the command densities of command sequences. Thus, there is no need to check for the operating voltage values appropriate for the respective user programs PGM in advance.

Therefore, the operating voltage values appropriate for executing the user programs PGM can be supplied to the cores from the first time the user programs PGM are executed. Furthermore, even if a user program PGM is updated, appropriate operating voltage values can be supplied to the cores.

Additionally, in the information processing device in Patent Document 2 also, the operating voltage values are changed in accordance with a command sequence in order to reduce excess power. In the information processing device in Patent Document 2, in a command sequence, an operating voltage value control command is added to the front of consecutive commands to issue an operating voltage value change instruction. Normally, when performing voltage control, there is a time lag between the time at which the operating voltage value change instruction is issued and the time at which the operating voltage values are actually changed. For this reason, in the information processing device in Patent Document 2, there is a time lag between the time at which an operating voltage value change instruction is issued and the time at which the operating voltage values of the cores are actually changed.

In contrast therewith, the information processing device 1 in the present embodiment changes the voltages supplied to the respective cores during CSW times before the execution of the respective user programs PGM.

Therefore, the information processing device 1 in the present embodiment can suppress the occurrence of time lag in the voltage change such as that in Patent Document 2.

Second Embodiment

An information processing device according to a second embodiment will be explained with reference to FIGS. 4 and 5.

The information processing device 1' according to the present embodiment differs in that a power source is shared by the cores. Aside from the points explained below, the structure of the information processing device 1' is similar to that of the information processing device 1 according to the first embodiment.

(Structure)

Figure 4:
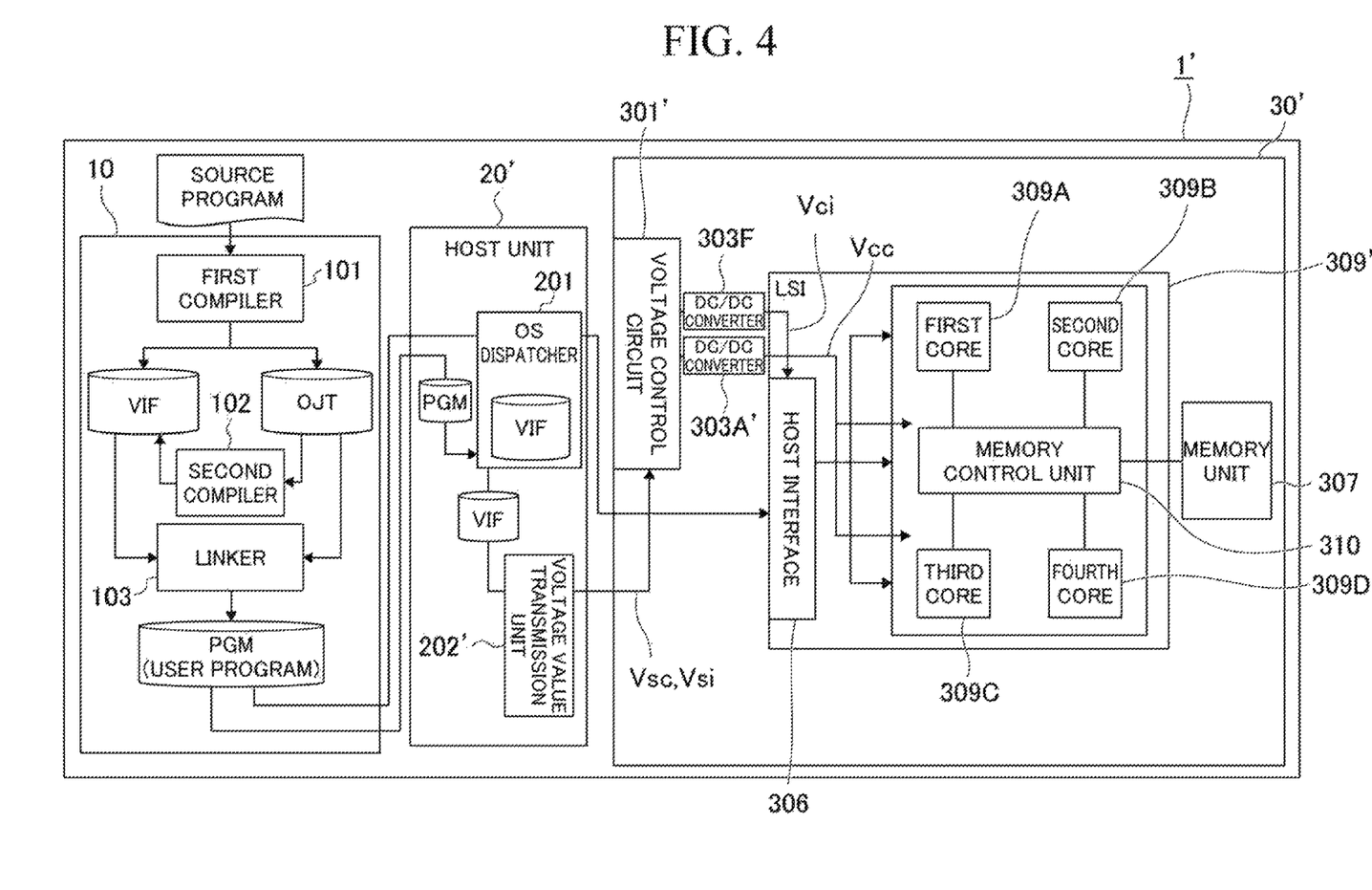
FIG. 4 is a block diagram of an information processing device according to a second embodiment.

As illustrated in FIG. 4, the information processing device 1' is provided with a program generation unit 10, a host unit 20', and a system unit 30'.

The host unit 20' is provided with an OS dispatcher 201 and a voltage value transmission unit 202'.

The system unit 30' is provided with a voltage control circuit 301', a memory unit 307, and an LSI 309'.

The system unit 30' is further provided with an internal power source 303A' and an IO power source 303F. In the present embodiment, these power sources are DC/DC converters, and the output voltages are controlled by control from the voltage control circuit 301'.

The voltage value transmission unit 202' sequentially receives the voltage value information VIF of the respective user programs PGM from the OS dispatcher 201.

The voltage value transmission unit 202' generates set voltage values based on the voltage value information VIF of the respective user programs PGM, and sends the set voltage values to the voltage control circuit 301'.

(System Unit)

Before the respective user programs PGM are executed, the system unit 30' sets the operating voltage values in the respective cores to the set voltage values transmitted from the voltage value transmission unit 202'.

The voltage control circuit 301' receives the set voltage values from the voltage value transmission unit 202'. The voltage control circuit 301' respectively controls the output voltages from the internal power source 303A' and the TO power source 303F based on the set voltage values that have been received.

The internal power source 303A' is a power source that is common to the first core 309A, the second core 309B, the third core 309C, the fourth core 309D, and the memory control unit 310.

The internal power source 303A' outputs a common operating voltage Vcc, which is a prescribed DC voltage, in accordance with control by the voltage control circuit 301', and supplies power to the first core 309A, the second core 309B, the third core 309C, the fourth core 309D, and the memory control unit 310.

(Voltage Transmission Unit)

The functions of the voltage value transmission unit 202' will be explained in detail.

Figure 5:
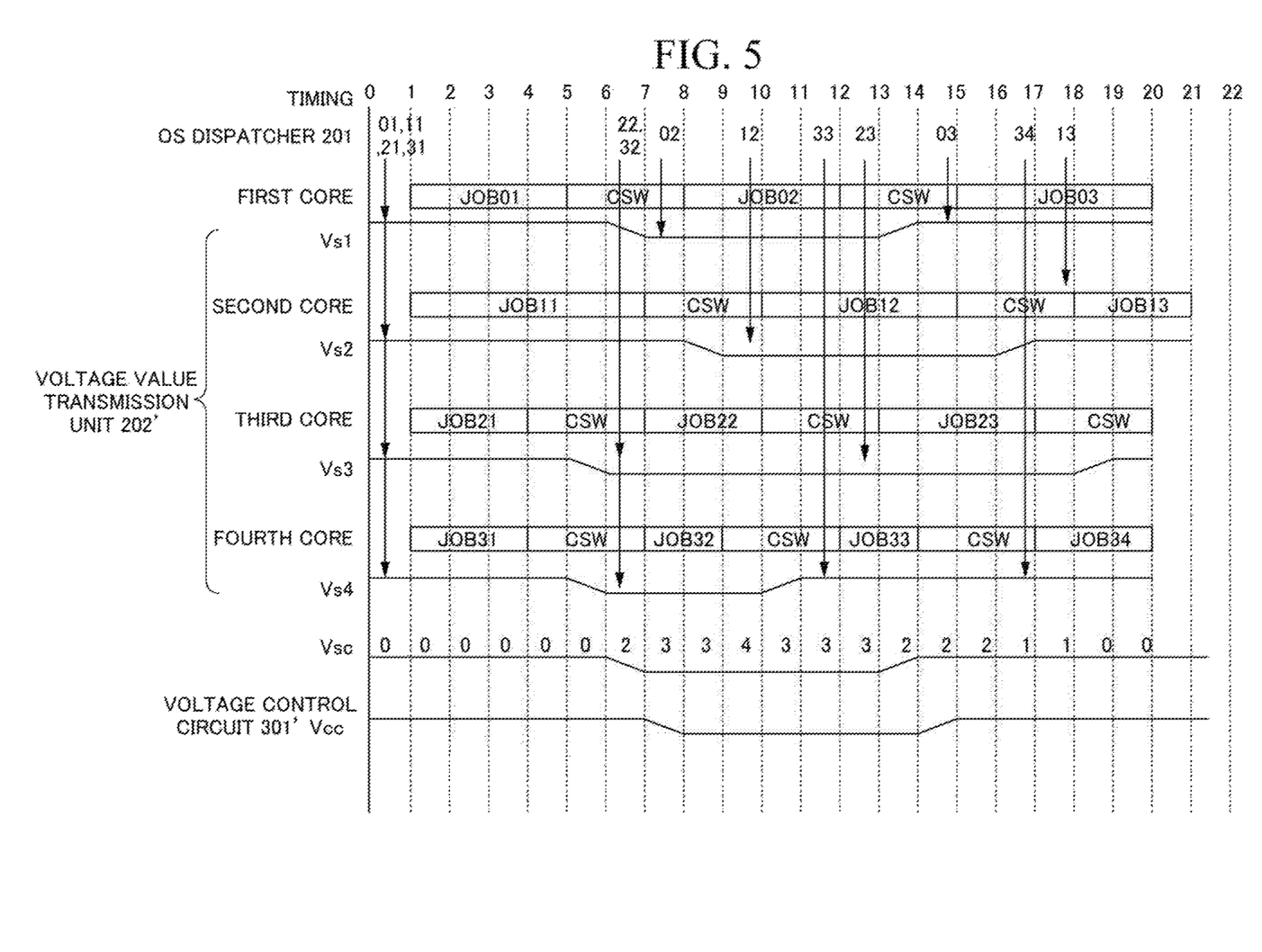
FIG. 5 is a time chart of the operations in the information processing device according to the second embodiment.

FIG. 5 is a time chart of the operations in the information processing device according to the second embodiment. As illustrated in FIG. 5, first, at timing 0, a first core set voltage value Vs1, a second core set voltage value Vs2, a third core set voltage value Vs3, and a fourth core set voltage value Vs4 are generated.

Next, at timing 0, the generated first core set voltage value Vs1, the second core set voltage value Vs2, the third core set voltage value Vs3, and the fourth core set voltage value Vs4 are summed to compute a common set voltage value Vsc.

Next, at timing 0, the voltage value transmission unit 202' sends the generated common set voltage value Vsc to the voltage control circuit 301'.

The voltage control circuit 301', upon receiving the common set voltage value Vsc from the voltage value transmission unit 202', controls the internal power source 303A' so that the common operating voltage value Vcc becomes the common set voltage value Vsc at timing 0.

Though not illustrated in FIG. 5, the information processing device 1' similarly sets the host interface operating voltage value Vci, separately from the common operating voltage value Vcc.

In other words, at timing 0, the voltage value transmission unit 202' generates, as the host interface set voltage value Vsi, a voltage value appropriate for the host interface 306 based on the voltage value information VIF, and sends the generated host interface set voltage value Vsi to the voltage control circuit 301'. Furthermore, the voltage control circuit 301' controls the IO power source 303F so that the host interface operating voltage value Vci supplied to the host interface 306 becomes the host interface set voltage value Vsi.

(Common Set Voltage Value Computation)

In the present embodiment, the voltage value transmission unit 202' computes the common set voltage value Vsc before the respective user programs PGM are executed (CSW times before the execution of the user programs PGM). The voltage value transmission unit 202' computes the common set voltage value Vsc by summing the respective set voltage values of the four cores, namely, the first core set voltage value Vs1, the second core set voltage value Vs2, the third core set voltage value Vs3, and the fourth core set voltage value Vs4, at each timing.

Examples of summation of the set voltage values will be explained.

First, for each of the set voltage values of the four cores, the voltage value transmission unit 202' counts the number of instructions for lowering the set voltage value (voltage value lowering instruction number), as indicated in FIG. 5. When there are three or more voltage value lowering instructions (voltage value lowering instruction number≥3), the voltage value transmission unit 202' generates, as the new common set voltage value Vsc, a voltage lower than the common set voltage value Vsc that was set, and sends the new common set voltage value Vsc to the voltage control circuit 301'.

Upon receiving the new common set voltage value Vsc from the voltage value transmission unit 202', the voltage control circuit 301' controls the internal power source 303A' so that the common operating voltage value Vcc becomes the new common set voltage value Vsc, before the respective user programs are executed (CSW times before the execution of the user programs PGM).

In the information processing device 1', the original common operating voltage value Vcc is set so as to be able to operate even with a user program PGM in which the maximum electric current flows. For this reason, if the common operating voltage value Vcc is lowered on the basis of the criterion "voltage value lowering instruction number of four cores≥3", then the user programs PGM can be executed without hindering the operation of the user programs PGM.

According to FIG. 5, at timing 7, the voltage value lowering instruction number shifts to become three or higher. For this reason, the voltage value transmission unit 202' generates a lower voltage as a new common set voltage value Vsc. As indicated at timing 8, the voltage control circuit 301' controls the internal power source 303' so that the common set voltage value Vcc becomes the new common set voltage value Vsc. As a result thereof, the information processing device 1' lowers the voltage supplied to the respective cores and the memory control unit 310 one timing before the timing at which the execution of JOB02 is started.

Conversely, when the voltage value lowering instruction number returns to being less than three (voltage value lowering instruction number<3), the information processing device 1' makes the common operating voltage value Vcc higher, as indicated at timing 15 in FIG. 5.

According to FIG. 5, the voltage value lowering instruction number shifts to become less than three at timing 14. For this reason, the voltage value transmission unit 202' generates a higher voltage as a new common set voltage value Vsc. The voltage control circuit 301' controls the internal power source 303A' so that the common operating voltage value Vcc becomes the new common set voltage value Vsc, as indicated at timing 15. As a result thereof, the information processing device 1' raises the voltage supplied to the respective cores and the memory control unit 310 one timing before the timing at which the execution of JOB03 is started.

In the present embodiment, the voltage value transmission unit 202' changes the common set voltage value Vsc when the voltage value lowering instruction number shifts to become three or higher, or when the voltage value lowering instruction number shifts to become less than three. However, the invention is not limited to this example. The voltage value transmission unit 202' may, for example, change the common set voltage value Vsc when the voltage value lowering instruction number shifts to become two or higher, or when the voltage value lowering instruction number shifts to become less than two. When changing the common set voltage value Vsc, the voltage value transmission unit 202' may recompute the common set voltage value Vsc by summing the set voltage values of the respective cores.

(Functions and Effects)

In the information processing device 1' of the present embodiment, as in the information processing device 1 of the first embodiment, the second compiler 102 analyzes the respective command densities of fixed point number commands, LDST commands, logic operation commands, shift operation commands, and floating point number commands in a command sequence. For this reason, voltages appropriate for the respective user programs PGM can be supplied to the respective cores and the host interface without checking for the operating voltage values that are appropriate for the respective user programs in advance. Thus, it becomes possible to eliminate wasted power consumption.

Therefore, in the information processing device 1', changes to the operating voltage values in accordance with the respective user programs PGM do not tend to become a burden.

Additionally, in the information processing device 1' of the present embodiment, as in the information processing device 1 of the first embodiment, the common operating voltage value is changed during CSW times before the execution of the respective user programs PGM.

Additionally, in the information processing device 1' of the present embodiment, the internal power source 303A' is a power source that is common to the first core 309A, the second core 309B, the third core 309C, the fourth core 309D, and the memory control unit 310. For this reason, according to the information processing device 1' of the present embodiment, the number of power sources to be mounted can be suppressed relative to the information processing device 1 in the first embodiment. Thus, for example, the cost can be suppressed and the size of the information processing device 1' can be made smaller.

<Program Generation Method>

The program generation method in the above-mentioned embodiments will be explained with reference to FIG. 6.

Figure 6:
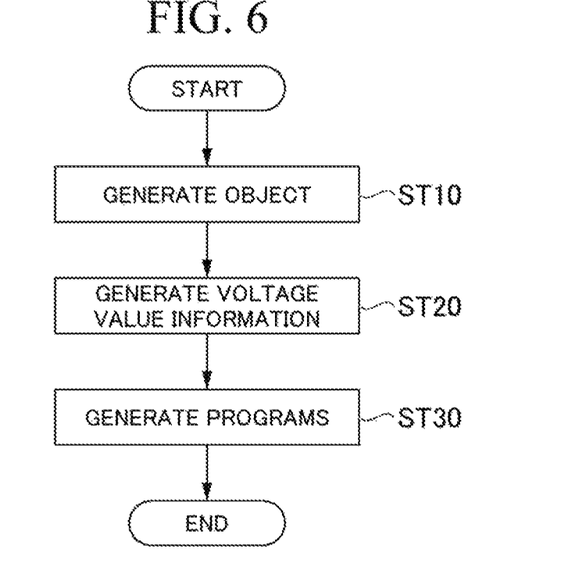
FIG. 6 is a flow chart of the program generation method according to each embodiment.

FIG. 6 is a flow chart of the program generation method according to the embodiments. The present program generation method generates user programs PGM to be executed by an LSI at operating voltage values based on voltage information VIF.

First, the program generation unit 10 compiles a source program prepared by a user, and generates an object including a command sequence (ST10: step of generating object).

Following the generation of the object in ST10, the program generation unit 10 analyzes the command densities in the command sequence and generates voltage value information (ST20: step of generating voltage value information).

Following the generation of the voltage value information in ST20, the program generation unit 10 links the object OJT with the voltage value information VIF, and generates user programs PGM (ST30: step of generating programs).

When the generation of the voltage value information ends in ST30, the process in the program generation unit 10 ends. Additionally, when the next source program is provided, the program generation unit 10 starts the process again.

<Hardware Structure>

Figure 7:
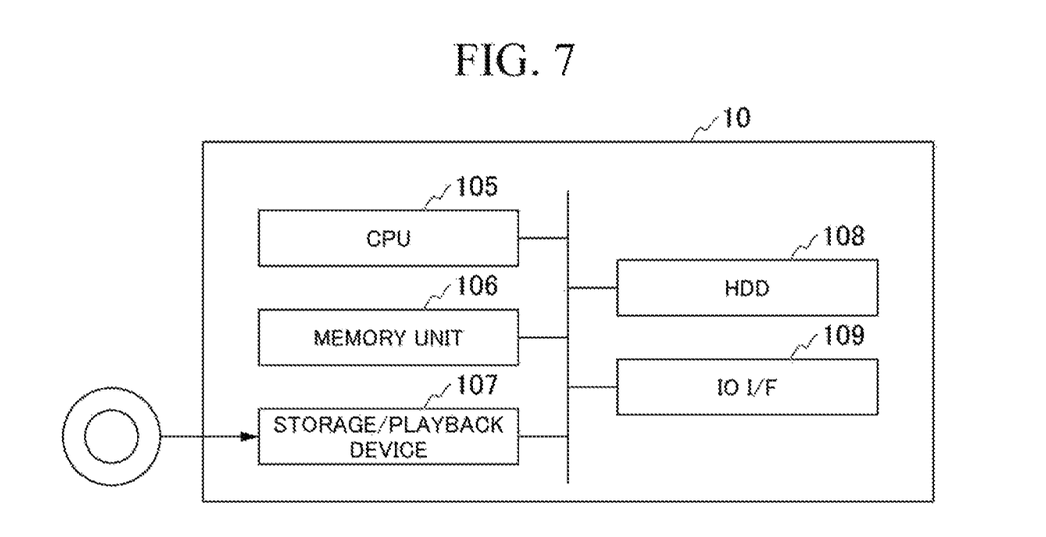
FIG. 7 is a hardware structure diagram of the program generation unit according to each embodiment.

FIG. 7 illustrates an example of a hardware structure for realizing the program generation unit 10 in the above-mentioned embodiments. As illustrated in this diagram, the program generation unit 10 is a computer provided with hardware including a CPU (Central Processing Unit) 105, a memory unit 106, a storage/playback device 107, a HDD (Hard Disk Drive) 108, an IO interface (Input Output Interface) 109, and the like.

The memory unit 106 is a storage medium such as a RAM (Random Access Memory) or a ROM (Read Only Memory).

The storage/playback device 107 is a device for storing programs, data, and the like in external media such as a CD-ROM, a DVD, or a flash memory, and for playing programs, data, and the like in the external media.

The 10 interface 109 is an interface for inputting source programs, and for inputting and outputting information and the like with respect to the host unit 20 (20').

<Computer Program>

In the above-mentioned embodiments, the processes in the respective units may be performed by storing a program for realizing all or some of the functions of the program generation unit on a computer-readable storage medium, reading the program stored on this recording medium into a computer system, and executing the program. The "computer system" mentioned here includes hardware such as an OS and peripheral devices.

Additionally, the "computer system" includes homepage-providing environments (or display environments) in the case in which a WWW system is used.

Additionally, "computer-readable recording medium" refers to portable media such as flexible disks, magneto-optic disks, ROMs, and CD-ROMs, and also to storage apparatus, such as hard disks, installed internally in a computer system. Furthermore, the "computer-readable recording medium" may include those that dynamically hold the program for a short time, such as communication cables when the program is transmitted over a network such as the internet or over a communication line such as a telephone line, and in this case, may include those that hold the program for a certain period of time, such as volatile memory inside a computer system used as a server or a client. Additionally, the above-mentioned program may be for the purpose of realizing some of the aforementioned functions, and furthermore, the aforementioned functions may be able to be realized by being combined with a program that is already stored in the computer system.

Minimum Structures of Embodiments

Figure 8:
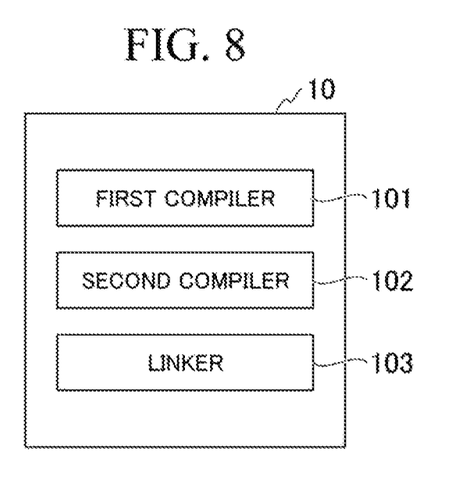
FIG. 8 is a minimum structure diagram of the program generation unit according to each embodiment.

FIG. 8 illustrates the minimum structure of the program generation unit 10 in the above-mentioned embodiments.

The program generation unit 10 generates voltage value information for making an LSI run on operating voltage values based on voltage contexts.

The program generation unit 10 is provided with a first compiler 101, a second compiler 102, and a linker 103.

The first compiler 10 compiles a source program and generates an object including a command sequence. The second compiler 102 analyzes the command densities in the command sequence and generates voltage value information. The linker 103 links the object with voltage value information and generates user programs.

Modified Examples

In the above-mentioned embodiments, the LSI is composed of four cores, but it may be composed of any number of cores. As a modified example, it may be composed of five or more cores. As another modified example, it may be composed of three or fewer cores.

In the above-mentioned embodiments, the second compiler 102 classifies the commands included in the command sequence into command types including LDST commands, logic operation commands, shift operation commands, fixed point number commands, and floating point number commands. As a modified example, the second compiler 102 may classify the respective commands included in the command sequence into at least two or more command types among LDST commands, logic operation commands, shift operation commands, fixed point number commands, and floating point number commands. Additionally, the command types may include command types other than LDST commands, logic operation commands, shift operation commands, fixed point number commands, and floating point number commands.

In the above-mentioned first embodiment, the information processing device controls the memory control operating voltage value Vcm so as to be a prescribed initial setting voltage value. As a modified example, the information processing device may generate a memory control set voltage value appropriate for the memory control unit based on voltage value information VIF, and may control the memory control operating voltage value Vcm so as to be a memory control set voltage value.

In the above-mentioned second embodiment, the respective set voltage values of the four cores are summed to compute the common set voltage value Vsc. As a modified example, the host interface set voltage value Vsi may be summed together with the respective set voltage values of the four cores.

Although various embodiments of the present invention have been explained above, these embodiments were merely described as examples, and they are not intended to limit the scope of the invention. These embodiments may be implemented in various other forms, and various omissions, replacements and changes may be made within a range not departing from the spirit of the invention. These embodiments and modifications thereof are included in the scope and the gist of the invention, and are likewise included in the invention as recited in the claims and the range of equivalents thereof.

Priority is claimed on Japanese Patent Application No. 2018-051582, filed Mar. 19, 2018, the entire disclosure of which is incorporated herein by reference.

INDUSTRIAL APPLICABILITY

According to the present invention, changing operating voltage values in accordance with user programs does not tend to create a burden.

REFERENCE SIGNS LIST

1 Information processing device
1' Information processing device

10 Program generation unit
20 Host unit
20' Host unit
30 System unit
30' System unit
101 First compiler
102 Second compiler
103 Linker
106 Memory
107 Storage/playback device
108 HDD
109 IO interface
201 OS dispatcher
202 Voltage value transmission unit
202' Voltage value transmission unit
301 Voltage control circuit
301' Voltage control circuit
303A First core power source
303A' Internal power source
303B Second core power source
303C Third core power source
303D Fourth core power source
303E Memory control power source
303F IO power source
306 Host interface
307 Memory unit
309 LSI
309' LSI
309A First core
309B Second core
309C Third core
309D Fourth core
310 Memory control unit
SQC Command sequence
Vc1 First core operating voltage value
Vc2 Second core operating voltage value
Vc3 Third core operating voltage value
Vc4 Fourth core operating voltage value
Vcc Common operating voltage value
Vci Host interface operating voltage value
Vcm Memory control operating voltage value
Vs1 First core set voltage value
Vs2 Second core set voltage value
Vs3 Third core set voltage value
Vs4 Fourth core set voltage value
Vsc Common set voltage value
Vsi Host interface set voltage value

What is claimed is:

1. A program generation device comprising:
at least one memory configured to store instructions; and
at least one processor configured to execute the instructions to:
compile a source program and generate an object including a command sequence comprising a plurality of commands, each command having a command type that is one of plurality of command types;
determine a plurality of command densities corresponding to the plurality of command types, each command density comprising a proportion of the commands within the command sequence having the command type to which the command density corresponds;
select, from the plurality of command densities, the command density having a greatest proportion of the commands within the command sequence having the command type to which the command density corresponds;
generate voltage value information, for making a Large Scale Integration (LSI) run on an operating voltage value, based on the selected command density; and
link the object, which is generated by compiling the source program, with the voltage value information to generate a user program to be executed by the LSI.

2. The program generation device according to claim 1, wherein the plurality of command types comprise at least two or more of: load/store (LDST)-type commands, logic operation-type commands, shift operation-type commands, fixed point number-type commands, and floating point number-type commands.

3. An information processing device comprising:
a Large Scale Integration (LSI) having a processor core operable at an operating voltage based on a voltage value;
a program generation device having at least one memory configured to store instructions and at least one processor configured to execute the instructions to:
compile a source program and generate an object including a command sequence comprising a plurality of commands each command having a command type that is one of a plurality of command types;
determine a plurality of command densities corresponding to the plurality of command types, each command density comprising a proportion of the commands within the command sequence having the command type to which the command density corresponds;
select, from the plurality of command densities, the command density having a greatest proportion of the commands within the command sequence having the command type to which the command density corresponds;
generate the voltage value information, for making the LSI run on an operating voltage value, based on the selected command density; and
link the object, which is generated by compiling the source program, with the voltage value information to generate a user program to be executed by the LSI; and
a host unit having a processor configured to generate the voltage value based on the voltage value information,
wherein the operating voltage of the processor core of the LSI is set to the voltage value before the processor core executes the user program.

4. The information processing device according to claim 3, wherein the processor core is a first processor core of a plurality of processor cores of the LSI, the voltage value is a first voltage value, and the processor of the host unit is further configured to:
generate a plurality of second voltage values respectively corresponding to second processor cores of the plurality of cores; and
calculate a total voltage value as a sum of the first voltage value and the second voltage values,
and an operating voltage value for plurality of cores as a whole is set to the total voltage value.

5. A program generation method comprising:
compiling a source program to generate an object including a command sequence comprising a plurality of commands, each command having a command type that is one of plurality of command types;
determining a plurality of command densities corresponding to the plurality of command types, each command density comprising a proportion of the commands within the command sequence having the command type to which the command density corresponds;

selecting, from the plurality of command densities, the command density having a greatest proportion of the commands within the command sequence having the command type to which the command density corresponds;

generating voltage value information, for making a Large Scale Integration (LSI) run on an operating voltage value, based on the selected command density; and linking the object, which is generated by compiling the source program, with the voltage value information to generate a user program to be executed by the LSI.

\* \* \* \* \*